(12) United States Patent
Volfkovich et al.

(10) Patent No.: US 7,006,346 B2
(45) Date of Patent: Feb. 28, 2006

(54) POSITIVE ELECTRODE OF AN ELECTRIC DOUBLE LAYER CAPACITOR

(75) Inventors: Yuri Mironovich Volfkovich, Moscow (RU); Alexey Yurievich Rychagov, Moscow (RU); Nina Azrielevna Urisson, Moscow (RU); Tatiana M. Serdyuk, Moscow (RU)

(73) Assignee: C and T Company, Inc., Vaughan (CA)

( * ) Notice: Subject to any disclaimer, the term of this patent is extended or adjusted under 35 U.S.C. 154(b) by 25 days.

(21) Appl. No.: 10/820,544

(22) Filed: Apr. 8, 2004

(65) Prior Publication Data

US 2005/0002150 A1    Jan. 6, 2005

Related U.S. Application Data

(60) Provisional application No. 60/461,440, filed on Apr. 9, 2003.

(51) Int. Cl.
*H01G 9/00* (2006.01)
*H01G 9/145* (2006.01)
(52) U.S. Cl. .................. 361/502; 361/503; 361/508
(58) Field of Classification Search ............ 361/502, 361/503, 508–511
See application file for complete search history.

(56) References Cited

U.S. PATENT DOCUMENTS

| | | | |
|---|---|---|---|
| 4,313,084 A | 1/1982 | Hosokawa et al. | |
| 4,562,511 A | 12/1985 | Nishino et al. | 361/324 |
| 4,888,666 A | 12/1989 | Naitoh et al. | |
| 5,949,637 A * | 9/1999 | Iwaida et al. | 361/502 |
| 6,115,235 A | 9/2000 | Naito | |
| 6,195,252 B1 | 2/2001 | Belyakov et al. | 361/502 |
| 6,426,862 B1 | 7/2002 | Vasechkin et al. | 361/502 |
| 6,466,429 B1 | 10/2002 | Volfkovich et al. | 361/502 |
| 6,628,504 B1 | 9/2003 | Volfkovich et al. | 361/502 |
| 2005/0034507 A1 | 2/2005 | Volfovich et al. | |

FOREIGN PATENT DOCUMENTS

| JP | 2-11008 | 1/1990 |
|---|---|---|
| WO | WO97/05718 | 2/1997 |

OTHER PUBLICATIONS

Volfkovich, Y., M. and Bagotsky, V.S., "The Method of Standard Porosimerty," *J. Power Sources* 48:327-339 (1994).

* cited by examiner

*Primary Examiner*—Eric W. Thomas
(74) *Attorney, Agent, or Firm*—Evelyn H. McConathy, Esq.; Drinker, Biddle & Reath LLP

(57) ABSTRACT

Provided in the present invention is a positive electrode for use in an Electric Double Layer (EDL) Hybrid Electrochemical Capacitor (HEC). Embodiments of the invention can be further adapted produce an EDL HEC with a high specific energy value and a high maximum voltage value. Some aspects of an embodiment of the present invention, including the aforementioned positive electrode, also cooperate to provide an EDL HEC that has a relatively high cycleability.

21 Claims, 4 Drawing Sheets

POSITIVE ELECTRODE OF AN ELECTRIC DOUBLE LAYER CAPACITOR

CROSS REFERENCE TO RELATED APPLICATIONS

This application claims the benefit of U.S. Provisional Application No. 60/461,440, which was filed on Apr. 9, 2003, and the entire contents of which is hereby incorporated by reference.

FIELD OF THE INVENTION

The invention relates to Electric Double Layer (EDL) capacitors, and, in particular to the design of a positive electrode for an EDL capacitor.

BACKGROUND OF THE INVENTION

Electric Double Layer (EDL) capacitors have much higher capacitance than conventional electrostatic and electrolytic capacitors—up to tens or hundreds of farads per gram of active electrode material. Consequently, EDL capacitors can be usefully employed as backup power sources in systems requiring uninterrupted electric power supply. For example, EDL capacitors are used for this purpose in computers and communication devices.

For example, some conventional EDL capacitor designs are disclosed in U.S. Pat. Nos. 4,313,084 and 4,562,511. Conventional EDL capacitors include two porous polarizable electrodes that are each coupled to a respective current collector. The electrodes are typically made of carbonaceous materials and are spaced apart by a porous dielectric separator. The electrodes, the current collectors and the separator are fixed in place by a casing, which also encloses some amount of a free volume. A liquid electrolyte, which can be either non-aqueous or aqueous, is retained in the pores of the electrodes, the separator and in the free volume.

A disadvantage of conventional EDL capacitors is that they have rather low specific energies. A conventional EDL capacitor employing a non-aqueous electrolyte will have a maximum specific energy of about 3 Wh/l and maximum voltage value in the range of 3 to 3.5 V. Non-aqueous electrolytes generally have low conductivity and, as a result, EDL capacitors employing them can only permit relatively low discharge and charge currents. Employing an aqueous electrolyte produces EDL capacitors having even lower specific energies (e.g., approximately 0.5 to 2 Wh/l) and lower maximum voltage values (e.g., approximately 0.9 V); and furthermore, the positive electrode of such a EDL capacitor is prone to corrosion or oxidation when the EDL capacitor is charged for long periods, as it may be in a backup power supply.

As an alternative, there are a number of EDL capacitors that are each made up of one polarizable electrode and one non-polarizable electrode. The non-polarizable electrode is the Positive Electrode (PE) and the polarizable electrode is the Negative Electrode (NE).

One example of an EDL capacitor having only one polarizable electrode is described in a published Japanese Application, No. 2-11008. The non-polarizable electrode is made of either lithium or a lithium alloy and a non-aqueous solution serves as the liquid electrolyte. This EDL capacitor has a higher specific energy than a conventional EDL capacitor. However, because the electrolyte is non-aqueous, this EDL capacitor can only handle/support relatively low discharge and charge currents; and, therefore, very low power density. This EDL device also has a relatively low cycleability. That is, it may only be used in a relatively low number (e.g., 100 to 200) of charge and discharge cycles before it is expected to fail.

Another example of an EDL capacitor with only one polarizable electrode is disclosed in PCT Patent Application WO 97/07518. The non-polarizable electrode is made of nickel oxide and an aqueous solution of alkaline metal carbonate or hydroxide serves as the liquid electrolyte. This EDL capacitor is considerably better than a conventional EDL capacitor with respect to both specific energy and maximum voltage. However, this EDL capacitor has a number of shortcomings. First, although the specific energy is high it is not high enough for some applications. Second, this EDL capacitor is expensive to produce since it requires large quantities of nickel oxide.

U.S. Pat. Nos. 6,195,252, 6,426,8862, 6,466,429, and 6,628,504 disclose EDL capacitors in which a non-polarizable electrode (i.e., the positive electrode) includes an active mass made up of lead dioxide ($PbO_2$) and lead sulfate ($PbSO_4$). The electrolyte in these EDL capacitors is contained only in the pores of the electrodes and the separator. There is no free electrolyte within the EDL capacitors since the components are pressed together by reinforcement plates. The pressure provided by the reinforcement plates is necessary to maintain a somewhat reliable contact between the polarizable electrode (i.e., the negative electrode) and the protective layer of the negative electrode current collector.

However, the pressure is not enough to guarantee reliable contact after a significant number of charge and discharge cycles. Volume changes of several tens of percents (up to 50%) are typical during cycling. After repeated volume changes the contact between the active mass and the rest of the positive electrode gradually becomes weaker and the active mass sheds from the rest of the positive electrode. Specifically, the bond between the active mass and the rest of the positive electrode weakens in the direction coinciding with the electrode plane; since, in this direction there is no compressive force between the active mass and the rest of the positive electrode.

Moreover, an active mass under high compression has low porosity, which, in turn, brings about a decrease in capacity. There are also other factors that cause the electrodes to have uneven thicknesses, which, in turn leads to uneven compression and varying pore structure across the surface of the electrodes. Consequently, the potential on the electrode surfaces and the electrolyte will be distributed non-uniformly; and, thus the capacitance is lowered and there will be a substantial self-discharge effect that is also detrimental to the performance of the EDL capacitor.

SUMMARY OF THE INVENTION

According to an aspect of an embodiment of the invention there is provided a positive electrode for use in a Electric Double Layer (EDL) Hybrid Electrochemical Capacitor (HEC), the positive electrode having a lead foil that is punctured serving as a current collector for the positive electrode; and an active mass made up of lead dioxide ($PbO_2$) and lead sulfate ($PbSO_4$), wherein the active mass is applied to one or both sides of the lead foil.

According to another aspect of the aforementioned embodiment of the invention there is also provided an Electric Double Layer (EDL) Hybrid Electrochemical Capacitor (HEC) including: a positive electrode similar to the aforementioned; a polarizable negative electrode; a porous dielectric separator interposed between the positive electrode and the polarizable negative electrode; a current collector coupled to the polarizable negative electrode consisting of metal layers and a protective layers, wherein the protective layers are respectively interposed between the polarizable negative electrode and the metal layers; a liquid electrolyte contained in the positive electrode, the polarizable negative electrode and the porous dielectric separator; and reinforcement plates which encase the positive electrode, the porous dielectric separator, the polarizable negative electrode, and the current collector.

In some embodiments an EDL capacitor according to aspects of an embodiment of the present the present invention includes a current collector for a positive electrode that is made of a lead foil or lead grid onto which (one- or two-sided) a porous active mass is applied. In some embodiments the active mass is made up of a composition of lead dioxide and lead sulfate at different ratios. Reinforcement plates are also included to ensure that the active mass is pressed to the positive electrode current collector. Thus, at prolonged cycling shedding of the active mass from the current collector is avoided by designing the EDL capacitor so that the direction of the lines of electric forces coincide with the direction of the lines of compression forces.

In some embodiments the lead foil and/or grid can be made in crimped, wrought or other three-dimensional form with developed surface. This aims to ensure better adhesion of the active layer to the lead foil and/or grid. The lead grid can be made by piercing of lead foil from one or both sides using metal needles with varying section. The holes ensure substantial contact between the active mass and the lead foil. In such embodiments the total surface area of the holes in the lead foil is less than 70% of the initial surface area of the lead foil.

In some embodiments the positive electrode current collector is made from either lead or a leady alloy. In such embodiments the alloying elements may be, for example, silver, calcium, copper, or tin. Moreover, other additives may also be added to the lead alloy to reduce corrosion rate.

In some embodiments the active mass can be taken from formed positive electrodes commonly used in lead-acid batteries.

Alternatively, in other embodiments the active mass can be electrochemically formed directly in an EDL HEC from paste compositions commonly used in lead-acid batteries, the counter electrode being the negative polarizable electrode of EDL HEC.

As another alternative, in other embodiments, the active mass can be prepared from chemical reagents such as lead sulphate (PbO2) and lead sulfate (PbSO4) in different ratios. In such embodiments, the ratio between the lead dioxide and the lead sulfate is preferably taken within the range of 1:0.1 to 1:2.5. The ratio is to approximately correspond to the initial state of charge of the negative electrode. For extended cycling of an EDL HEC, it is desirable to start with electrodes having approximately equal state of charge.

In some embodiments the active mass of the positive electrode can contain one or more dispersed binding agents. In such embodiments it is preferable that the binding agent (s) employed impart higher durability to the active mass so as to diminish the negative impact of compression on the porosity of the active mass and, thereby, increase cycleability of the electrode and an EDL HEC as a whole. The binding agent(s) can be polymers such as PTFE, PVDF, proton-exchange polyfluorsulfonic acid of the Nafion type, glass fiber, etc. Moreover, a dispersed porophore, e.g., ammonium bicarbonate, can be added when the active mass of the positive electrode is prepared.

In some embodiments filing agents can be added to the active mass that reinforce it and decrease the degradation rate during prolonged cycling. Materials such as glass fibres and thin cuttings of separators used in lead-acid batteries can be named as examples of such filling agents. The fillers not only strengthen the active mass during cycling, but also serve as additional reservoirs for electrolyte (sulfuric acid) contained within the pores of the fillers.

In some embodiments a dispersed porophore (e.g., graphite, ammonium bicarbonate) can be added to the active mass. If porophores have been added to the active mass, they are later preferably removed by heating the entire active mass to an appropriate temperature in another manufacturing step.

In some embodiments the preparation of a positive electrode includes steps such as uniform application of the active mass on one or both sides of a punctured lead foil/grid, pressing, and sintering at elevated temperature.

Other aspects and features of the present invention will become apparent, to those ordinarily skilled in the art, upon review of the following description of the specific embodiments of the invention.

BRIEF DESCRIPTION OF THE DRAWINGS

Preferred embodiments of the invention will now be described with reference to the attached drawings.

DETAILED DESCRIPTION OF EMBODIMENTS OF THE INVENTION

Figure 1:
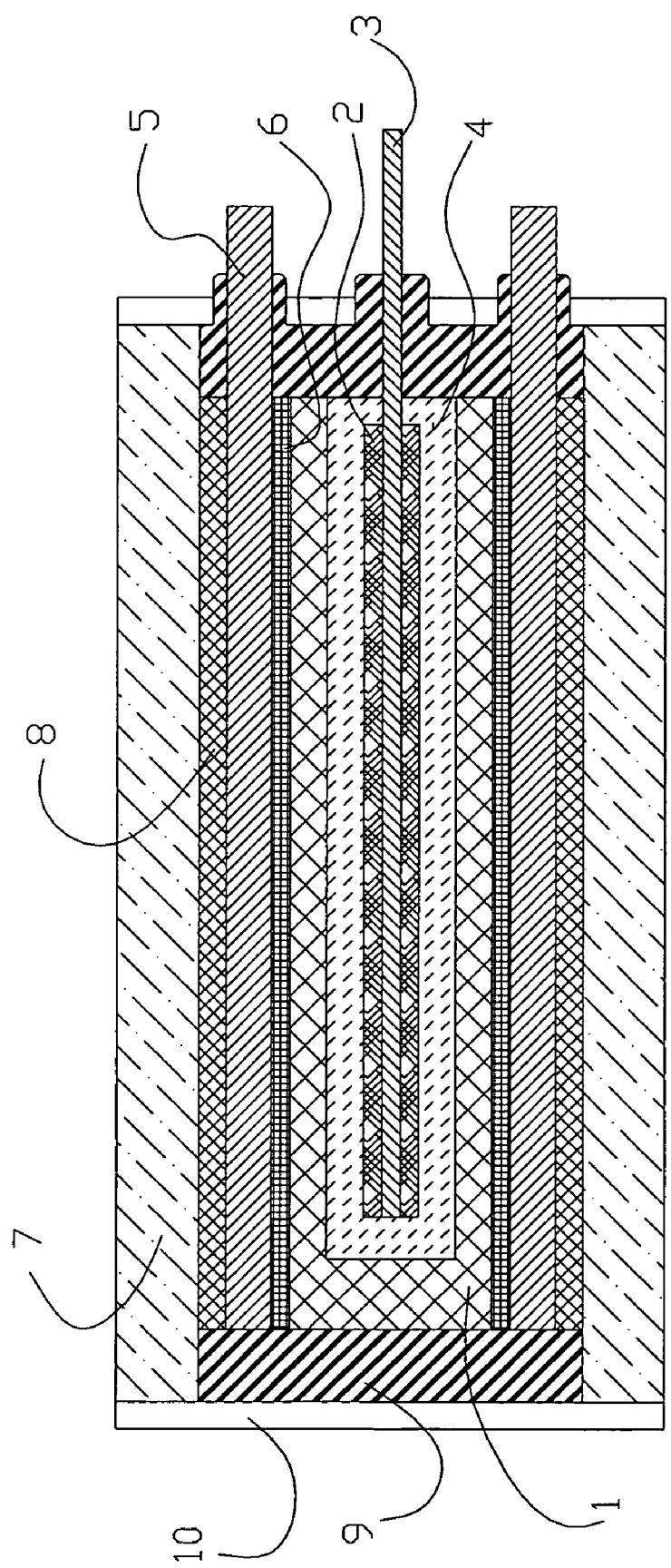
FIG. 1 is an illustration of a cross-sectional view of a Electric Double Layer (EDL) Hybrid Electrochemical Capacitor (HEC) according to an embodiment of the invention.

With reference to FIG. 1, illustrated is a cross-sectional view of an Electric Double Layer (EDL) Hybrid Electrochemical Capacitor (HEC) according to an embodiment of the invention. The EDL HEC in FIG. 1 includes a number of structural elements that are used to physically support and enclose a number of electrical components also included in the EDL HEC. In some embodiments the electrical components are arranged to provide the EDL HEC with a high specific energy value and a high maximum voltage value. In some embodiments the electrical and structural components cooperate to ensure that the EDL HEC has a relatively high cycleability.

The structural components of the EDL HEC include reinforcement plates 7, (porous or compact) rubber gaskets 8, an acid-resistant sealant 9 and a pressure-resistant case 10. Those skilled in the art would appreciate that numerous materials and/or compounds may be successfully employed for the different structural elements 7, 8, 9 and 10.

The electrical components of the EDL HEC include a positive electrode that is made up of an active mass 2 of lead dioxide ($PbO_2$) and lead sulfate ($PbSO_4$) soaked in a suitable electrolyte (not illustrated).

In some embodiments the electrolyte is advantageously an aqueous solution of sulfuric acid. The active mass 2 surrounds a current collector 3. In some embodiments the current collector 3 is made from either lead or a lead based alloy. The co-operative relationship between the active mass 2 and the current collector 3 will be described in further detail below with reference to FIG. 2.

The EDL HEC also includes a porous dielectric separator 4 that is also soaked in the electrolyte. The porous dielectric separator 4 is non-conductive; and, in some embodiments, as is shown in FIG. 1, the porous dielectric separator 4 surrounds the active mass 2 of the positive electrode and the porous dielectric separator 4 is itself surrounded by a negative electrode 1.

In some embodiments the negative electrode 1 is made of a carbonaceous (i.e., carbon-based) material and the negative electrode 1 is also soaked in the electrolyte. The negative electrode 1 is coupled to metal layers 5 of the negative electrode current collectors. There are protective layers 6 interposed between the negative electrode 1 and the current collectors 5. In some embodiments the protective layers 6 are made of graphite foil. In some embodiments, the backside of the metal layers 5 (porous or compact) rubber gaskets 8 are interposed between the metal layers 5 and the reinforcing plates 7. The purpose of the rubber gaskets 8 will be discussed in detail below.

Figure 2:
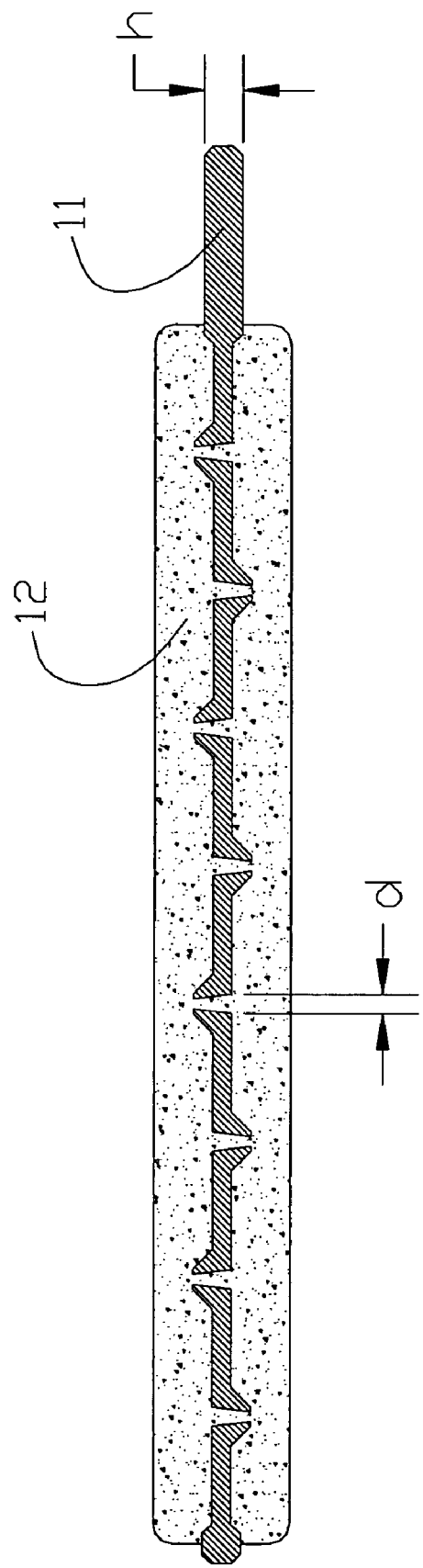
FIG. 2 is an illustration of an enlarged cross-sectional view of a positive electrode for use with the EDL HEC, as shown in FIG. 1, according to an embodiment of the invention.

Referring to FIG. 2, illustrated is an enlarged cross-sectional view of a positive electrode according to an embodiment of the invention. In particular, the positive electrode includes a punctured lead foil (or lead grid) 11 on which a one or two-sided porous active mass 12 is applied. The lead foil 11 and the active mass 12 shown in FIG. 2, correspond to the current collector 3 and active mass 2 shown in FIG. 1, respectively. Again, in some embodiments the active mass 12 consists of lead dioxide (PbO2) and lead sulfate (PbSO4) at different ratios. The lead foil 11 can be made in a crimped, wrought or other three-dimensional form with a developed surface.

With continued reference to FIG. 2, in some embodiments, the lead foil 11 is punctured from one or both sides with needles. In some embodiments the total surface area of the holes (from the needles) is less than 70% of the initial surface area of the lead foil 11. The lead foil 11 can be made of lead alloy instead of pure lead. In such embodiments the alloying elements may be, for example, silver, calcium, copper, or tin. Moreover, other additives may also be added to the lead alloy to reduce corrosion rate.

The active mass 12 of the positive electrode can contain one or more dispersed binding agents. The binding agent can be a polymer such as PTFE, PVDF, proton-exchange polyfluorsulfonic acid of the Nafion type, or glass fiber. Moreover, a dispersed porophore, e.g., ammonium bicarbonate, can be added when the active mass 12 is prepared. If the porophores are added to the active mass 12, they are removed in another manufacturing step by heating the entire active mass 12 to an appropriate temperature. Moreover, the preparation of the positive electrode includes a uniform application of the active mass 12 on one or both sides of the lead foil 11, pressing, and sintering at elevated temperatures.

During operation of an EDL HEC, for example like the one shown in FIG. 1 in accordance with an embodiment of the invention, the following reversible electrochemical reaction takes place during discharge and charge of the active mass 2 of the positive electrode:

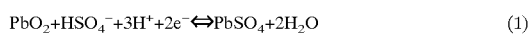  (1)

The maximum equilibrium potential of this reaction depends on the concentration of the electrolyte, and in some embodiments, in the charged state it is greater than 1.9 V.

During cycling, the negative electrode 1 is recharged. The recharge of the EDL HEC can be described as follows:

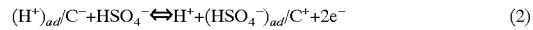  (2)

In reaction (2), the designation $(H^+)_{ad}/C^-$ refers to a proton adsorbed in the EDL HEC on the negatively charged surface of the negative electrode 1 (for the charged state of the capacitor), and $(HSO_4^-)_{ad}/C^+$ to a bisulfate ion adsorbed in the EDL HEC on the positively charged surface of the negative electrode 1 (for the discharged state of the capacitor).

Combining of reactions (1) and (2) gives the overall equation of the electrochemical reaction taking place:

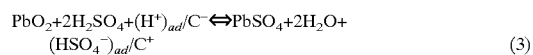  (3)

It was noted above that the structural components and the electrical components cooperate to ensure a relatively high cycleability for EDL HEC's designed in accordance with an embodiment of the invention. The EDL HEC design shown in FIG. 1 includes one or more structural components that provide complete or partial offset and/or shock-absorption of the change in the thickness of the positive electrode due to changes in chemical composition, weight, and density of the positive electrode during cycling associated with the general process $PbO_2 \leftrightarrows PbSO_4$. The negative electrode 1 and/or porous dielectric separator 4, shown in FIG. 1, can be used as the offsetting and/or shock-absorbing components. These components of the EDL HEC design have certain gas porosity (free pores) ratio, which is determined by the total amount (i.e., volume) of electrolyte employed in relation to the free pore volume.

A desired gas porosity ratio in the negative electrode 1 and/or porous dielectric separator 4 can be achieved by measurements of the pore structure of all porous components of the EDL HEC as well as by insertion of a predetermined total volume of the electrolyte. The measurements of the pore structure of the porous components of the EDL HEC are performed using the method of standard porosimetry (see, for example, Yu et al., "The Method Of Standard Porosimetry," *J. Power Sources*, 48 (1994) 327, 339).

Another offsetting or shock-absorbing component can be the (porous or compact) rubber gaskets 8, also shown in FIG. 1, placed on the back side of the negative electrode current collector metal layers 5.

The combination of electrode design and pressure applied by the reinforcing plates 7 results in improved contact between the active mass 2 and the current collector 3 of the positive electrode. In an EDL HEC according to the present invention, the mechanical lines of force provided by the reinforcement plates 7 coincide with the electrical lines of force. Accordingly, the volume change of the active mass during charge and discharge do not lead to shedding. Therefore a positive consequence is that the cycleability is considerably improved relative to that of similar capacitors previously known (see, for example, U.S. Pat. No. 6,466,429).

With reference to FIGS. 1–4, the following describes general results of some very specific example experiments that have been provided herein to illustrate aspects of the present invention.

EXAMPLES

Example 1

Referring first to the positive electrode shown in FIG. 2, the lead foil 11 in this example had dimensions of 70×50 mm and a thickness of 0.15 mm. The lead foil 11 was punctured with a punch having 0.6 mm needles. The surface are of the holes was 20% of the total surface area of the lead foil 11. The active mass 12 was prepared from a mixture of pure chemical substances $PbO_2$ and $PbSO_4$ at a 1:0.8 ratio. The initial state of charge of the negative electrode was taken into account when this ratio was determined. A 3% PTFE binding agent in form of water suspension was added to the paste, as well as 3% of finely cut glass fibres. The paste was applied on both sides of the punctured lead foil 11. The pressure applied was 50 kg/cm². Sintering temperature was 110° C. At a charged state the porosity was 48%, and the specific gravity after excessive charge was 0.3 g/cm².

Figure 3:
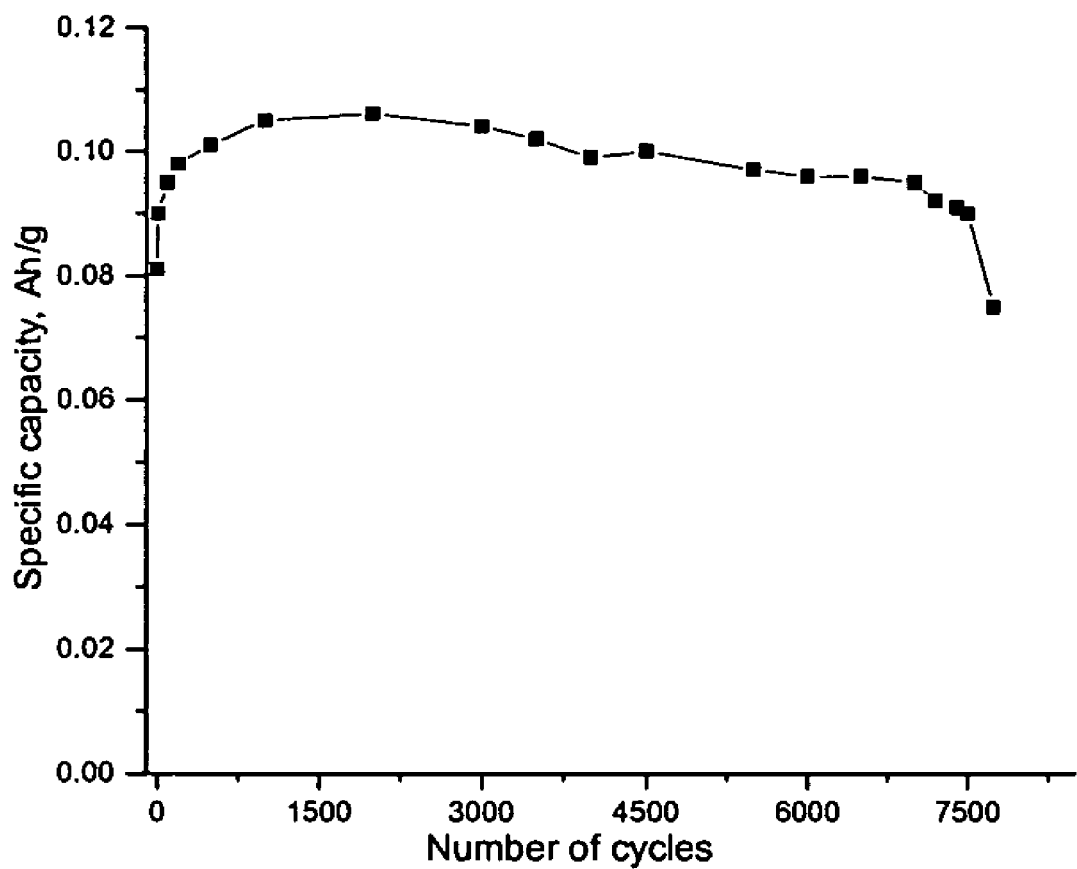
FIG. 3 is a graphical representation of a measured cycling performance for an example EDL HEC according to an embodiment of the invention.

With further reference to the EDL HEC illustrated in FIG. 1, a negative electrode 1 was made of three layers of activated carbon cloth (specific surface of 1200 m²/g). The compression between the reinforcement plates 7 was 7 kg/cm²; and 35% sulfuric acid was used as electrolyte to which 1% phosphoric acid was added. A polytetrafluoroethylene-based hydrophilic material was used for the separator 4 and 75% of its pore volume was flooded with electrolyte. The pores of the negative electrode were flooded to 68%. Current density of 0.1 A/g was used and the charging time was 20 min. The EDL HEC capacitor was cycled within the range of 0.6 to 2.2 V. The average specific capacity obtained was 0.102 Ah per gram of active mass, which is 45.4% of the theoretical. With further reference to FIG. 3, it can be seen that the EDL HEC capacitor reached 7740 cycles before failing.

Example 2

Again referring first to the positive electrode shown in FIG. 2, the lead foil 11 was made of a lead alloy with 0.7% Sn, 0.05% Cu, and 0.01% Ca. The dimensions of the lead foil 11 were 70×50 mm and the thickness 0.4 mm. It was pierced with a punch having 2-mm borers. The surface area of the holes was 30% of the total surface area of the lead foil 11.

The initial active mass 12 was made from a paste of 4PbO☐PbSO4, which is widely used for formation of positive plates in lead-acid batteries. Proton-exchange polyfluorsulfonic acid of Nafion type was added as a binding agent (2%) as well as 3% of finely cut separator of Grace type. The paste was applied on both sides of the punctured lead foil 11 at total amount of 0.5 g/cm2. It was directly formed within the EDL HEC (refer to FIG. 1). The formation was carried out in 10% sulfuric acid to which 0.5% of phosphoric acid was added. The pressure did not exceed 1 kg/cm2. Porosity of the electrodes after formation amounted to 60%.

The electrolyte was then concentrated to 35% of sulfuric acid and the cell was compressed with 5 kg/cm2. Two negative electrodes 1 made of activated carbon ADG with specific surface of 1150 m2/g were used. Layers of the dense rubber gaskets 8 were placed on the backside of the metal layers 5 of the current collector for shock absorption. A 0.5 mm thick AGM type separator was used, 65% of its pores being flooded with electrolyte. The pores of the negative electrode 1 were flooded to 71%. Current density of 0.1 A/g was used. The EDL HEC was cycled within the range of 0.6 to 2.2 V. The average specific capacity obtained was 0.092 Ah per gram active mass, which is 40.1% of the theoretical. The EDL HEC reached 6930 cycles before failure.

Example 3

Again referring to the positive electrode shown in FIG. 2, the lead foil 11 used in this example had dimensions 70×50 mm and a thickness of 0.1 mm. The lead foil 11 was punctured with a punch having 0.5-mm needles. The surface area of the holes was 15% of the total surface area of the lead foil 11. The active mass 12 was taken from preliminary discharged to 30% positive electrodes of commercially available lead-acid battery. The active mass 12 had particle size of 100 to 200 um. A 4% PVDF binding agent in form of water suspension was added. The paste was applied on one side of the punctured lead foil 11 at total amount of 0.07 g/cm².

Figure 4:
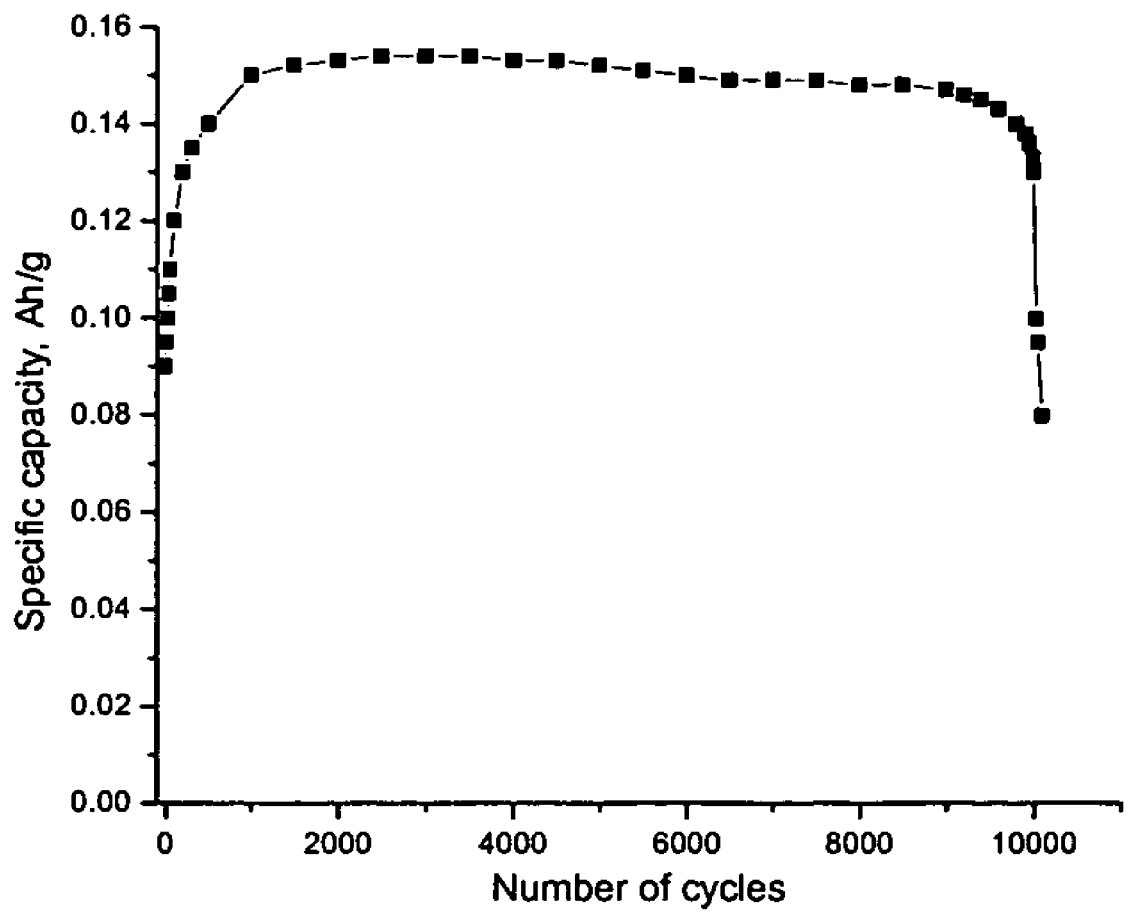
FIG. 4 is a graphical representation of a measured cycling performance for another example EDL HEC according to an embodiment of the invention.

The electrode was dried at room temperature and pressed with 80 kg/cm². Sintering temperature was 105° C. At charged state the porosity was 55%. Again, the EDL HEC is depicted in FIG. 1. The negative electrode 1 was made of activated carbon ADG with specific surface of 1150 m²/g. Layers of the dense rubber gaskets 8 were placed on the backside of the metal layers 5 of the negative electrode current collectors for shock absorption. The compression between the reinforcement plates 7 was 6 kg/cm². A 35% sulfuric acid was used as electrolyte to which 1% phosphoric acid was added. A Grace type separator was used for the separator 4 and 70% of its pores were flooded with electrolyte. The pores of the negative electrode were flooded to 79%. Current density of 0.4 A/g was used and the charging time was 30 min. The EDL HEC was cycled within the range of 0.6 to 2.2 V. The average specific capacity obtained was 0.15 Ah per gram of active mass, which is 66.8% from the theoretical. With further reference to FIG. 4, the EDL HEC reached 10900 cycles before failure.

Example 4

Again referring first to the positive electrode shown in FIG. 2, the lead foil 11 was made of lead alloy with 0.7% Sn, 0.01% Ca, and 0.005% Ag. The dimensions of the lead foil 11 were 70×50 mm and the thickness 0.2 mm. The lead foil 11 was punctured with a punch having 2-mm borers as in Example 2, and then corrugated with rectangular punch at every 2 mm. The surface area of the holes was 10% of the total surface area of the lead foil 11.

The active mass 12 was prepared from a mixture of pure chemical substances $PbO_2$ and $PbSO_4$ at a 1:0.5 ratio. A 5% PTFE binding agent in form of suspension in 5% sulfuric acid was added to the paste. A 0.5% graphite powder with particle size of 100 to 200 um was added as well as a porophore. The paste was applied on both sides of the punctured and corrugated lead foil 11 at total amount of 0.5 g/cm². It was subsequently dried in open for 24 h and pressed with 20 kg/cm². Sintering temperature was 105° C. At charged state the porosity was 60%.

Again, the EDL HEC is depicted in FIG. 1. Two negative electrodes 1 were made of activated carbon ADG with specific surface of 1150 m²/g. Layers of the dense rubber gaskets 8 were placed on the back-side of the metal layers 5 of the negative electrode current collectors for shock absorption. The compression between the reinforcement plates 7 was 3 kg/cm². Further 35% sulfuric acid was used as electrolyte to which 1% phosphoric acid was added. A 1 mm thick AGM type separator 4 was used, 67% of its pores being flooded with electrolyte. The pores of the negative electrode 1 were flooded to 77%. Current density of 0.05 A/g was used and the charging time was 30 min. The EDL HEC was cycled within the range of 0.6 to 2.2 V. The average specific capacity obtained was 0.12 Ah per gram of active mass, which is 55% from the theoretical. The EDL HEC reached 7100 cycles before failure.

In sum, EDL HECs according to the present invention are superior to the EDL capacitors that use conventional grid-type positive electrodes from commercial lead-acid batteries. A significant advantage of the positive electrode of the EDL HEC's described herein is that they have flat surfaces unlike the grid-type conventional electrodes. This provides parallel electrical lines of force and, thus, uniformity of surface properties of the capacitor during operation. This decreases the self-discharge and improves performance. Accordingly, from the examples above it is obvious that EDL HEC's according to the present invention has the following advantages over other known EDL capacitors: a) better cycle life at higher depth of discharge of the positive electrode; b) higher specific capacities; and c) shorter charging times. Hence, the EDL HEC's employing positive electrodes according to the present invention can be advantageously used in automotive vehicles for energy recuperation, electric starters for internal combustion engines, and power supplies for electric motors. Furthermore, they are also applicable in devices that use capacitors conventionally, for example, backup power supplies, computers, communication devices, etc.

The disclosures of each patent, patent application and publication cited or described in this document are hereby incorporated herein by reference, in their entirety.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention. Such modifications and additional embodiments are also intended to fall within the scope of the appended claims. It is therefore to be understood that within the scope of the appended claims, the invention may be practiced otherwise than as specifically described herein.

We claim:

1. A positive electrode for use in an Electric Double Layer (EDL) Hybrid Electrochemical Capacitor (HEC), the positive electrode comprising:
    a lead foil that is punctured, serving as a current collector for the positive electrode; and
    an active mass comprising lead dioxide ($PbO_2$) and lead sulfate ($PbSO_4$), wherein the active mass is applied to one or both sides of the lead foil.

2. The positive electrode according to claim 1, wherein the lead foil further has a three dimensional surface resulting from a surface treatment selected from the group consisting of being crimped, wrought and developed.

3. The positive electrode according to claim 1, wherein holes in the punctured lead foil comprise a total surface area that is less than 70% of a total initial surface area of the punctured lead foil.

4. The positive electrode according to claim 3, wherein holes in the punctured lead foil are made by needles inserted from one or both sides of the lead foil.

5. The positive electrode according to claim 1, wherein the lead foil comprises a lead alloy, wherein the lead alloy comprises alloying elements selected from the group consisting of silver, calcium, copper and tin, and combinations thereof.

6. The positive electrode according to claim 5, wherein the lead alloy further comprises additives to reduce corrosion.

7. The positive electrode according to claim 1, wherein the active mass is taken from a lead-acid battery.

8. The positive electrode according to claim 1, wherein the active mass is electrochemically formed directly within a EDL HEC from pastes of the types used in the formation of lead-acid batteries.

9. The positive electrode according to claim 1, wherein within the active mass, the lead dioxide and the lead sulfate ratio ranges from 1:0.1 to 1:2.5 by weight, respectively.

10. The positive electrode according to claim 1, wherein the active mass further comprises at least one binding agent.

11. The positive electrode according to claim 10, wherein the at least one binding agent comprises a polymer selected from the group consisting of PTFE, PVDF and proton-exchange polyfluorsulfonic acid of the Nafion type.

12. The positive electrode according to claim 11, wherein the active mass further comprises a filler material comprising glass fibers and thin cuttings of a separator material used in lead-acid batteries.

13. The positive electrode according to claim 1, wherein the active mass further comprises a dispersed porophore comprising graphite or ammonium bicarbonate.

14. The positive electrode according to claim 1, wherein the active mass is uniformly applied to one or two sides of the lead foil, and the entire positive electrode has been subjected to pressing and sintering at an elevated temperature.

15. An Electric Double Layer (EDL) Hybrid Electrochemical Capacitor (HEC) comprising:
    the positive electrode of claim 1;
    polarizable negative electrode; porous dielectric separator interposed between the positive electrode and polarizable negative electrode;
    current collector coupled to the polarizable negative electrode consisting of metal layers and a protective layers, wherein the protective layers are respectively interposed between the polarizable negative electrode and the metal layers;
    liquid electrolyte contained in the positive electrode, the polarizable negative electrode and the porous dielectric separator; and
    reinforcement plates that encase the positive electrode, the porous dielectric separator, the polarizable negative electrode, and the current collector.

16. The EDL HEC according to claim 15, wherein the negative electrode comprises at least one carbonaceous material.

17. The EDL HEC according to claim 15, wherein the protective layers comprise at least one non-porous carbonaceous material.

18. The EDL HEC according to claim 15, wherein the liquid electrolyte comprises a solution of sulfuric acid.

19. The EDL HEC according to claim 15, having at least one component providing at least partial offset and/or shock-absorption of a change in thickness of the positive electrode during cycling of the EDL HEC.

20. The EDL HEC, according to claim 19, wherein either the negative electrode or the porous dielectric separator, or both the negative electrode and porous dielectric separator, provide the at least partial offset and/or shock-absorption of a change in thickness of the positive electrode during cycling of the EDL HEC.

21. The EDL HEC, according to claim 19, further comprising at least one rubber gasket interposed between at least one of the reinforcing plates and at least one metal layer of the current collector for providing the at least partial offset and/or shock-absorption of a change in thickness of the positive electrode during cycling of the EDL HEC.

* * * * *